(No Model.)

C. S. DIKEMAN.
CLIP FOR WHEEL RIMS.

No. 523,108.    Patented July 17, 1894.

Witnesses
E. F. Nottingham
G. F. Downing

Inventor
Charles S. Dikeman
By H. A. Seymour
Attorney

THE NORRIS PETERS CO., PHOTO-LITHO., WASHINGTON, D. C.

UNITED STATES PATENT OFFICE.

CHARLES S. DIKEMAN, OF TORRINGTON, CONNECTICUT.

CLIP FOR WHEEL-RIMS.

SPECIFICATION forming part of Letters Patent No. 523,108, dated July 17, 1894.

Application filed February 5, 1894. Serial No. 499,123. (No model.)

*To all whom it may concern:*

Be it known that I, CHARLES S. DIKEMAN, of Torrington, in the county of Litchfield and State of Connecticut, have invented certain new and useful Improvements in Clips for Wheel-Rims; and I do hereby declare the following to be a full, clear, and exact description of the invention, such as will enable others skilled in the art to which it appertains to make and use the same.

My invention relates to an improvement in clips for wheel rims and is designed more particularly as an improvement on the construction disclosed in Patent No. 509,021, granted me November 21, 1893.

The object of the present invention is to so construct the clip that it will overlap the flanged edges of the rim and prevent the meeting ends of the latter from springing apart, whereby the escape of the tire is prevented.

With this end in view my invention consists in certain novel features of construction and combinations of parts which will be hereinafter described and pointed out in the claims.

Figure 1:
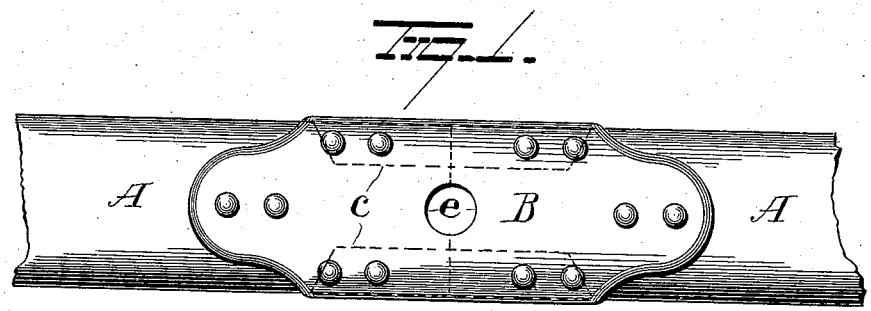
Figure 2:
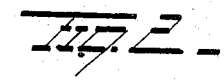
Figure 3:
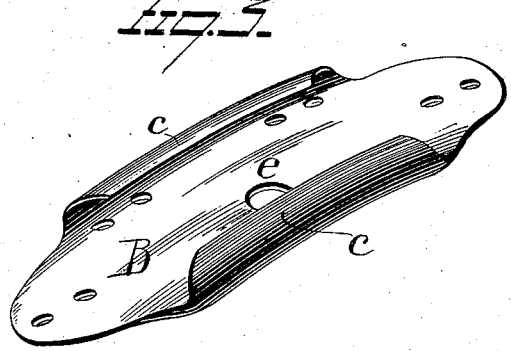

In the accompanying drawings, Figure 1 is a view illustrating my invention in its operative position. Fig. 2 is a cross-section of Fig. 1, and Fig. 3 is a detached view.

A represents the rim and $b$, $b$, the overlapping edges thereof, which latter are adapted to hold the tire in position in the rim. The rim may be made in the usual manner of any preferred material, as steel for instance, or of aluminum, which I prefer.

The meeting ends of rim A are secured together by means of a clip B, which latter forms the essential feature of my present improvement. The inwardly turned flanges $c$, $c$, of clip B, are adapted to overlap the flanges $b$, $b$, of rim A, whereby said flanges $b$, $b$, are held against outward movement. A hole $e$ is centrally located in clip B, and is adapted to align with hole $f$ formed at or near the meeting ends of said rim. Through holes $e$ and $f$ project the usual valve, to which is attached when necessary the device for inflating the tire.

The clip B can be made of any suitable material, but I prefer to construct the same of aluminum, and also prefer to complete said clip before attaching it to the rim.

The clip is applied as shown in Fig. 1 and is secured to the rim by any suitable means, rivets being preferably used. When the clip is in the position shown in Fig. 1, it will be apparent that the rim instead of being weak at its meeting point, is really made stronger than at any other place in it. It will also be seen that the meeting ends of the flanges $b$, $b$, will be prevented from turning outwardly, thus making the escape of the tire at this point impossible.

It is evident that changes in the construction and relative arrangement of the several parts might be made without avoiding my invention and hence I would have it understood that I do not restrict myself to the particular construction and arrangement of parts shown and described; but, Having fully described my invention, what I claim as new, and desire to secure by Letters Patent, is—

1. The combination with a wheel rim having overlapping tire clamping edges formed by bending the edges of the material forming the rim inwardly toward each other, of a clip consisting of a plate constructed to conform to and tightly fit the exterior of the rim and the tire clamping edges whereby to effect a rigid joint, at the ends of the rim, substantially as set forth.

2. The combination with a wheel rim having overlapping tire clamping edges formed by bending the edges of the material forming the rim inwardly toward each other, the ends of the rim made to abut each other and having a hole formed partly in each of them for the valve, of a clip constructed to receive and hold the ends of the rim together, said clip having flanges which overlap and embrace the tire clamping edges of the rim, said clip having a hole therein adapted to align with the hole in the rim, substantially as set forth.

In testimony whereof I have signed this specification in the presence of two subscribing witnesses.

CHARLES S. DIKEMAN.

Witnesses:
CHAS. L. MCNEIL,
ALBERT SPERRY.